Figures 1, 2, 3:
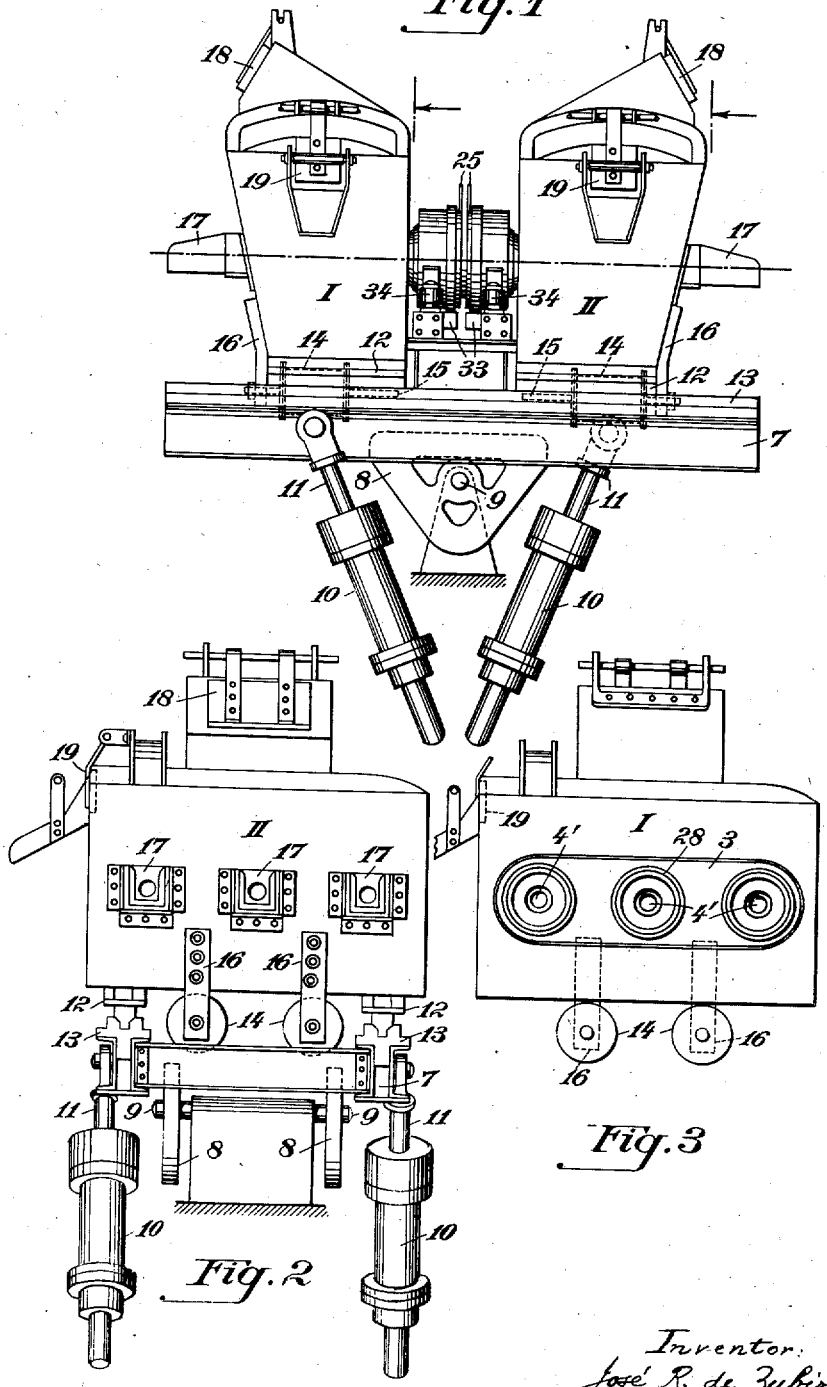

J. R. DE ZUBIRIA

Feb. 23, 1932. ELECTRIC INDUCTION FURNACE Re. 18,362

Original Filed April 16, 1926 2 Sheets-Sheet 1

Inventor:
José R. de Zubiria
by Lowe, Kellenberk & Farley
Attorneys.

Feb. 23, 1932.

J. R. DE ZUBIRIA

ELECTRIC INDUCTION FURNACE

Re. 18,362

Original Filed April 16, 1926 2 Sheets-Sheet 2

Inventor:
José R. de Zubiria
by Lotka, Kellenberg & Farley
Attorneys.

Reissued Feb. 23, 1932 Re. 18,362

UNITED STATES PATENT OFFICE

JOSÉ RICARDO DE ZUBIRIA, OF BILBAO, SPAIN, ASSIGNOR, BY MESNE ASSIGNMENTS, TO WILLIAM R. GLISSON, OF TEANECK, NEW JERSEY

ELECTRIC INDUCTION FURNACE

Original No. 1,647,787, dated November 1, 1927, Serial No. 102,416, filed April 16, 1926, and in Germany April 29, 1925. Application for reissue filed December 10, 1929. Serial No. 413,129.

It has been already proposed to use for the treatment of electrically conducting materials, more particularly of metals, electric induction furnaces in which two hearths were arranged diametrically of the central axis of the furnace and connected together by a series of relatively narrow horizontally arranged conduits. These conduits are carried through iron cores each of which is provided with a primary winding so that in the bar-like metal bodies contained in them and forming the secondary winding of each transformer, are induced powerful heating currents which flow over the metal masses contained in the two hearths. In order to obtain a mixture of the highly heated metal portions with the others and at the same time to protect the former from overheating, the furnace is mounted in such a manner that it can be turned about its central axis which is at right angles to the heating channels or troughs.

Such furnaces have been hitherto shown or made only diagrammatically, and the proposed constructions would probably have the drawback that the heating channels would cause in working considerable technical difficulties as they are firmly secured to the hearths and therefore are difficult of access. Moreover, the induction between the primary winding and the secondary conductor has not apparently been such as to enable the most favourable phase displacement angle to be obtained.

These drawbacks are avoided according to the invention, in the first place by inserting the heating channels surrounded by the transformer cores, between the two furnace parts containing the outer hearths, in an easily interchangeable manner. One or both hearths are preferably mounted so that they can be withdrawn, so that the heating channels clamped between them, can be easily withdrawn. Finally, the electric conditions of the furnace are substantially improved owing to the heating channels being surrounded with tubular cores covered in a substantially uniform manner over the whole circumference by the primary coil. The primary coil is preferably made of a single winding by causing it to surround the iron core in the form of a cylindrical casing divided from the outside for the current supply and return.

The easily interchangeable heating channels surrounded by the transformer cores also may preferably be used in furnaces where only one hearth is provided for different parts of which are connected by the said channels.

An embodiment of the new induction furnace for three phase current is shown in its main lines in the accompanying drawings.

Figure 4:
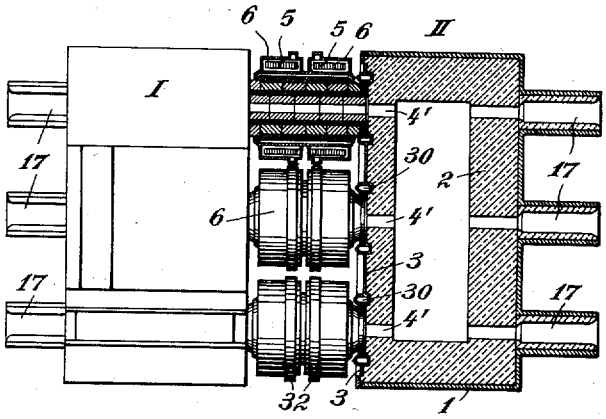
Figure 5:
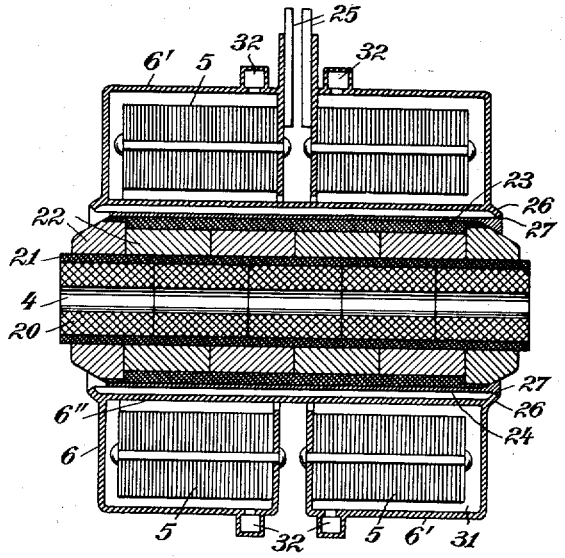

Figure 1 is a side elevation of the furnace,

Figure 2 a front elevation of the right hand hearth container,

Figure 3 an inner view of the left hand hearth container,

Figure 4 a plan with horizontal cross section through the right hand container, and Figure 5 is a vertical section, on an enlarged scale, through one of the heating channels showing the whole transformer.

The furnace contains two hearths I and II which, as shown in Figure 4, are constituted in the usual manner by an outer metal casing 1 and an inner brickwork lining 2. On the inner side facing the other hearth, into the outer wall is let in a thick metal plate of non-magnetic material, such as for instance a copper plate 3, in such a manner that it surrounds the joints or connections for the heating channels. To this plate are secured metal conduits 30 for water cooling which surround each of the joints.

The furnace is intended for working by three phase current, and accordingly is provided with three heating channels 4 arranged in a horizontal plane and connected to the corresponding conduits 4′ in the furnace wall. The heating channels are formed in a body of lining or brick material which is more fully described later on and is surrounded by two cylindrical iron cores 5 arranged side by side and by a copper winding 6 forming a hollow cylinder.

The hearths I and II are mounted on a frame 7 which is rotatable by means of a bracket 8 about pins 9, and can be turned about the pins 9 by means of rods 11 operated by hydraulic devices 10, so that the liquid metal contained in the hearths can be forced through the heating channels, and the energetic mixing already produced by the so-called "pinch" or "repulsion" effect, still further improved, the injurious action of the said effect being counteracted by the alternate excess of hydrostatic pressure of one or the other container. Each of the hearths rests at first by means of rail-like feet 12 on slide rails 13 of the frame 7 in such a manner that the hearths can be moved away from, or towards each other. This movement is produced by means of hydraulic apparatus 14, the piston rods 15 of which are secured to strong projections 16 of the hearths. In certain conditions, it will be sufficient to make only one of the hearths adjustable or travelling.

Opposite the heating channels 4 and the channels 4′ connected to the same in the lining 2 of the hearth, are arranged the tapping holes 17 of the hearths, namely in such a manner that these holes and the channels are situated exactly in line, so that when opening the tapping channels, the heating channels can be checked directly and treated by pushing through or in some other manner. In addition to the tapping holes 17, at the upper surface of the hearth are further provided charging and working openings 18, as well as openings 19 intended for decarburizing with compressed air.

The heating channels and transformers of the construction shown in Figure 5, are made in the following manner. A series of hollow cylinders 20 of magnesia are arranged axially next to each other and enclosed in a cylinder 21 rammed in a mould and constituted by a mixture of magnesia and tar. This mould is constituted by another cylinder 22 of clay also built up of sections. The joints of the cylinders 20 and 22 are staggered relatively to each other, in order to prevent the metal from getting through these joints. The cylinder 22 with a jacket 23 constituted by a mixture of tar and clay is arranged within a cylinder 24 of non-magnetic material.

On the latter cylinder rests the primary winding 6. This winding is constituted by a copper cylinder with very thick walls, the outer wall 6′ is bent inwards in the centre, without touching the inner wall 6″, so that two annular casings are produced which jointly utilize the inner wall 6″. Each of these casings is provided with a strong terminal 25 by means of which the primary current of the casing-shaped winding 6 is admitted or carried out. Inside the two casing parts are arranged the annular iron cores 5 made of laminated sheet metal. Between the walls of the copper casing and the core parts are left intermediate spaces 31 into which the cooling air is admitted through conduits 32. This air is admitted through branches 33 (Figure 1) provided on the frame 7 and on which the transformers fit when they are placed between the hearths. In addition, there are also provided branches 34 on which the transformers rest laterally.

For the purpose of facilitating the replacing in the transformer of the cartridge shaped lining body containing the heating channel 4 and enclosed by the metal cylinder 24, between these two parts is provided a bayonet joint. Accordingly the inner wall 6″ of the casing constituting the primary winding is provided with several projections 26 (Figure 5) extending axially and slightly inwards. With them co-operate, for locking, hook-shaped projections 27 of the metal cylinder 24. When the cartridge is inserted, the projections 27 pass between the projections 26, thereupon the cartridge is turned about its longitudinal axis until the locking parts 26, 27 engage with each other.

The inner lining or brickwork cylinder 20 of the heating channel projects axially beyond the outer cartridge body 22/24 and is pushed against a slightly recessed annular part 28 of the hearth, a tight joint being ensured by the tar and magnesia mixture of the rammed in ring 21 also at the end face. The tight joint is obtained owing to the fact that after the three cartridges with the transformers are placed in position between the hearths I and II, the latter are moved towards each other by means of the hydraulic devices 14 until the cartridges are clamped fast, and in that way connection is established between the channels 4 and the conduits 4′. Owing to the effective water cooling 30 of the joints, the escaping metal will be at first at once solidified and an absolutely tight joint will be automatically produced.

The new furnace has many advantages. First of all, the whole shape and lining of the hearths are exceedingly simple. Just as simple and clear is the insertion of the cartridges containing the heating channels and their renewal. It is sufficient to remove a damaged heating channel with transformer to introduce them into the latter a new cartridge, whereupon these parts can be at once inserted again between the two hearths. The manufacture of a new cartridge can also be effected quickly and simply, the single concentric lining or brickwork parts being built up inside the outer metal mould round a bar temporarily representing the channel or round a corresponding tube, by insertion and ramming. The replacement can be effected even when the furnace is charged with material, by turning it laterally in such a manner as to empty the heating channels.

The easy interchangeability of the cartridges makes it also possible to use heating channels of different cross section; if desired, acid or basic lining can be used for the purpose.

The peculiar shape of the transformers gives an excellent interlinking of the primary and secondary flow of force, the small cross section of the heating channels gives a high heating resistance, so that the power factor cos $\alpha$ becomes 0,9, and very large output can be obtained. It is also possible directly to work with high numbers of periods.

Finally the ratio of transformation 1:1 adopted in the construction illustrated by way of example, is favourable, as it gives low voltages on the primary winding. Accordingly there is no considerable difference of tension between the primary and the secondary side or towards earth, so that the primary winding can be touched without danger by the attendants at the furnace.

Of course in certain cases could also be used a primary winding of several windings in combination with the heating channel cartridges. In this case also, the windings surround the core in the most uniform manner possible. The windings are then preferably protected by a casing. The cooling air is then conveyed between the casing and the windings as well as between the latter and the iron core.

What I claim as my invention and desire to secure by Letters Patent is:—

1. An electric induction furnace comprising a frame and a hearth movably mounted thereon, an opening in the wall of said hearth, a straight tubular channel interchangeably connected to said opening, means adapted to adjust said hearth relatively to and force it against said channel, a transformer core surrounding said channel, and a primary winding on said core.

2. An electric induction furnace comprising a frame and two hearths, one of which is movably mounted thereon, openings in the walls of said hearths, a plurality of tubular channels interchangeably connected to said openings, transformer cores surrounding said channels, primary windings on said cores, and means to force one of said hearths toward the other against said channels.

3. An electric induction furnace comprising an electric supply, a frame and two hearths, one of which is movably mounted thereon, openings in the walls of said hearths, three straight tubular channels interchangeably connected to said openings, transformer cores surrounding said channels, primary windings on said cores connected to the three phases of said electric supply, and means to force one of said hearths toward the other against said channels.

4. An electric induction furnace comprising a frame and two hearths, one of which is movably mounted thereon, openings in the walls of said hearths, a plurality of horizontally arranged tubular channels, means at the mouths of said openings to hold the ends of said channels, transformer cores surrounding said channels, primary windings on said cores, and means to force one of said hearths toward the other against said channels.

5. An electric induction furnace comprising a frame and two hearths, one of which is movably mounted thereon, openings in the walls of said hearths, a plurality of tubular channels interchangeably connected to said openings, transformer cores surrounding said channels, primary windings on said cores, means to force one of said hearths toward the other against said channels, and means to give the whole furnace a rocking movement in such a direction that contents of said hearths is pushed through said channels.

6. A tubular channel for furnaces of the type described comprising a tube of refractory material, an iron core surrounding said tube, and a primary coil covering in substantially uniform manner the whole circumference of said core.

7. A tubular channel for furnaces of the type described comprising a tube of refractory material, an iron core surrounding said tube, and a copper casing interrupted at one side enclosing said core, constituting a primary coil.

8. A tubular channel for furnaces of the type described comprising a tube of refractory material, an iron core surrounding said tube, a copper casing constituting a primary coil covering in substantially uniform manner the whole circumference of said core, and conduits for air cooling between the wall of said copper casing and said core.

9. An electric induction furnace comprising a frame, two hearths on said frame, openings in the walls of said hearths, a plurality of tubular channels interchangeably connected to said openings, iron cores surrounding said channels, copper casings interrupted at one side, enclosing said cores constituting primary coils, cooling conduits in said copper casings, air conduits in said frame, and means connecting said conduits when the said channels and transformers are inserted between the hearths.

10. A tubular channel for furnaces of the type described comprising a cylindrical iron core, a primary coil on said core, and a tube of refractory material interchangeably inserted into said core.

11. A tubular channel for furnaces of the type described comprising a cylindrical iron core, a primary coil on said core, and a tube of refractory material interchangeably inserted into said core and consisting of cylinder sections joined at the front sides to each other, a jacket of rammed lining material and a tube of non-magnetic metal holding together the whole.

12. A tubular channel for furnaces of the type described comprising a cylindrical iron core, a copper casing surrounding said core constituting a primary coil, a tube of refractory material interchangeably inserted into said core and consisting of cylinder sections joined at the front sides to each other, a jacket of rammed lining material and a tube of non-magnetic metal holding together the whole, and locking devices in the manner of a bayonet joint at the inner part of said copper casing and at one end of said tube of non-magnetic metal.

13. A tubular channel for furnaces of the type described comprising a cylindrical iron core, a primary coil on said core, and a tube of refractory material interchangeably inserted into said core and consisting of two series of cylinder sections of refractory material built up to two cylinders the division joints of them being staggered relatively to each other, jackets of rammed lining material surrounding each of said cylinders and a tube of non-magnetic metal holding together the whole.

14. An electric induction furnace comprising two hearths, openings in the walls of said hearths, a plurality of tubular channels interchangeably connected to said openings, water cooling rings surrounding the mouths of said openings, transformer cores surrounding said channels, primary windings on said cores, and means to force one of said hearths against the other respectively against said channels.

15. An electric induction furnace comprising in combination, a frame and two spaced hearths supported thereon, one of which is movably mounted with respect to the other, openings in the walls of said hearths, a straight tubular channel interchangeably connected with said openings, means to force one of said hearths toward the other against said channel, a transformer core surrounding said channel, and a primary winding on said core.

In testimony whereof, I have signed my name to this specification this 15th day of November, 1929.

JOSÉ RICARDO DE ZUBIRIA.